(12) United States Patent
Wilkes et al.

(10) Patent No.: US 7,795,183 B2
(45) Date of Patent: Sep. 14, 2010

(54) ASPHALTENE INHIBITION

(75) Inventors: Mark F. Wilkes, Belper (GB); Mark C. Davies, Belper (GB)

(73) Assignee: The Lubrizol Corporation, Wickliffe, OH (US)

( * ) Notice: Subject to any disclaimer, the term of this patent is extended or adjusted under 35 U.S.C. 154(b) by 667 days.

(21) Appl. No.: 11/576,969

(22) PCT Filed: Oct. 26, 2005

(86) PCT No.: PCT/US2005/038982

§ 371 (c)(1),
(2), (4) Date: Apr. 10, 2007

(87) PCT Pub. No.: WO2006/047745

PCT Pub. Date: May 4, 2006

(65) Prior Publication Data

US 2008/0096772 A1    Apr. 24, 2008

Related U.S. Application Data

(60) Provisional application No. 60/622,500, filed on Oct. 27, 2004.

(51) Int. Cl.
*C09K 8/52* (2006.01)
*C08K 5/09* (2006.01)

(52) U.S. Cl. ......................................... 507/90; 524/322

(58) Field of Classification Search ................... 507/90; 524/322

See application file for complete search history.

(56) References Cited

U.S. PATENT DOCUMENTS 5,753,022 A    5/1998  Schofield et al.
2004/0163995 A1 *  8/2004  Cornelisse ............. 208/48 AA

FOREIGN PATENT DOCUMENTS

| GB | 2337522 A | * | 11/1999 |
| GB | 2337552 A |   | 11/1999 |
| WO | 00/24503 A1 |   | 5/2000 |
| WO | WO 02077111 A1 | * | 10/2002 |

* cited by examiner

*Primary Examiner*—Timothy J Kugel
*Assistant Examiner*—Aiqun Li
(74) *Attorney, Agent, or Firm*—Samuel B. Laferty; David M. Shold; Christopher D. Hilker

(57) ABSTRACT

The present invention provides a method of asphaltene control in a hydrocarbon fluid, the method employing a composition comprising: a dispersant of formulae (I) or (II), including salts thereof, wherein T or T' is hydrogen or a polymerizing terminating group; A is $C_{16-20}$ alkylene or alkenylene group; B is $C_{10-20}$ alkylene or alkenylene group; Z and Z' are the residue of a polyamine or polyimine; n is 2 to 50; m is 0 to 25; p and p' are 2 or more, in one embodiment not greater than 2000 and in another embodiment not greater than 1000; A' is $C_{8-20}$ alkylene or alkenylene group; n' is 2 to 10; and the weight ratio of T-(O-A-CO)$_n$ (O—B—CO)$_m$ to Z or T'-(O-A'-CO)$_{n'}$ to Z' is at least 5:1.

13 Claims, No Drawings

ASPHALTENE INHIBITION

CROSS REFERENCE TO RELATED APPLICATION

This application is filed pursuant to Provisional Application No. 60/622,500 filed on Oct. 27, 2004.

FIELD OF INVENTION

The present invention relates to a method of inhibiting the formation of asphaltene by treating a hydrocarbon fluid with a polymer composition.

BACKGROUND OF THE INVENTION

It is well known that a hydrocarbon fluids such as crude oil or residual oil deposit asphaltenes during production and/or use. In the example of a crude oil, asphaltenes are maintained in a stable colloidal dispersion in the hydrocarbon fluid under the temperature, pressure, composition and environmental conditions found in the oil bearing reservoir. However, when the temperature or pressure are reduced, e.g., during extraction from an oil reservoir, changes in composition (loss of gas and other light components) largely due to pressure and temperature changes enables asphaltene molecules to agglomerate or otherwise precipitate out to form asphaltene deposits. The asphaltene deposits are capable of causing occlusion and ultimately blockage within the oil bearing strata or anywhere else along the production and storage system through which the oil passes or is stored, including any pipe, conduit or storage vessel. The occlusion reduces production rates such that it becomes necessary to mechanically remove the deposits, resulting in loss of production, down-time and increased engineering costs.

In the case of asphaltenic residual and heavy fuels, the destabilization of the asphaltene colloid is generally due to similar reasons, but also due to the addition of cutter stocks or in-tank mixing of different and incompatible batches of fuel, which can result in a hydrocarbon environment which does not maintain the stability of the asphaltenes. An example of this often seen in practice is when ships change over to low sulphur fuel for entry into areas where the use of high sulphur fuels is prohibited. Changing over to low sulphur fuel can destabilize the asphaltene resulting in asphaltene deposition in pipework and possible blockage of filters, etc. Therefore, it is important to efficiently disperse agglomerated asphaltenes in the bulk hydrocarbon, or to remove and/or inhibit the formation of asphaltene deposits to avoid blockage in a crude oil production system.

In the case of asphaltene deposition in refinery and other petrochemical plant applications, a hydrocarbon stream already containing asphaltenes can be formed in situ. In this case, the asphaltene deposition results in the formation of carbonaceous deposits in a process known as coking or fouling.

Therefore, asphaltene deposits are known to be capable of causing blockage to a number of applications involving a hydrocarbon fluid, and it is important to remove or inhibit the formation of asphaltene deposits to avoid blockage of an oil well or pipelines.

British Patent Application GB 2,337,522 discloses a carboxylic polymer capable of reducing asphaltene deposition formed from at least one of (a) an ethylenically unsaturated alcohol, carboxylic acid or ester, (b) an ethylenically unsaturated carboxylic ester with a polar group in the ester, and (c) an ethylenically unsaturated carboxylic amide. A preferred polymer is a alkyl (meth)acrylate.

International Publication WO 01/055281 discloses an inhibitor for asphaltene deposition employing a compound selected from a polyhydric alcohol reacted with a carboxylic acid, an ester or ether formed from a glycidyl ether or epoxide.

It would be desirable to have a method of asphaltene control in a hydrocarbon fluid. The present invention provides method of asphaltene control in a hydrocarbon fluid.

SUMMARY OF THE INVENTION

The present invention provides a method of asphaltene control in a hydrocarbon fluid, the method employing a composition comprising: a dispersant of formulae (I) or (II), including salts thereof

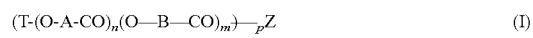

(I)

or

(II)

wherein

T or T' is hydrogen or a polymerising terminating group;

A is $C_{16-20}$ alkylene or alkenylene group, in one embodiment an alkenylene group;

B is $C_{10-20}$ alkylene or alkenylene group, in one embodiment an alkylene group;

Z and Z' are the residue of a polyamine or polyimine;

n is 2 to 50;

m is 0 to 25;

p and p' are 2 or more, in one embodiment not greater than 2000 and in another embodiment not greater than 1000;

A' is $C_{8-20}$ alkylene or alkenylene group;

n' is 2 to 10; and the weight ratio of T-(O-A-CO)$_n$ (O—B—CO)$_m$ to Z or T'-(O-A'-CO)$_{n'}$ to Z' is at least 5:1.

In one embodiment, the invention further provides a composition comprising:

(a) a hydrocarbon fluid;

(b) an oil of lubricating viscosity; and (c) a dispersant of formulae (I) or (II), including salts thereof

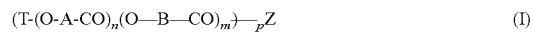

(I)

or

(II)

wherein

T or T' is hydrogen or a polymerising terminating group;

A is $C_{16-20}$ alkylene or alkenylene group, in one embodiment an alkenylene group;

B is $C_{10-20}$ alkylene or alkenylene group, in one embodiment an alkylene group;

Z and Z' are the residue of a polyamine or polyimine;

n is 2 to 50;

m is 0 to 25;

p and p' are 2 or more, in one embodiment not greater than 2000 and in another embodiment not greater than 1000;

A' is $C_{8-20}$ alkylene or alkenylene group;
n' is 2 to 10; and the weight ratio of T-(O-A-CO), (O—B—CO)$_m$ to Z or T'-(O-A'-CO), to Z' is at least 5:1.

DETAILED DESCRIPTION OF THE INVENTION

The present invention provides a method of asphaltene control in a hydrocarbon fluid, the method employing a composition comprising: a dispersant of formulae (I) or (II), including salts thereof

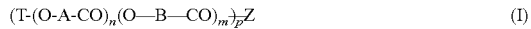

(I)

or

(II)

wherein
T or T' is hydrogen or a polymerising terminating group;
A is $C_{16-20}$ alkenylene group;
B is $C_{10-20}$ alkylene group;
Z and Z' are the residue of a polyamine or polyimine;
n is 2 to 50;
m is 0 to 25;
p and p' are 2 or more, in one embodiment not greater than 2000 and in another embodiment not greater than 1000;
A' is $C_{8-20}$ alkylene or alkenylene group;
n' is 2 to 10; and
the weight ratio of T-(O-A-CO)$_n$ (O—B—CO)$_m$ to Z or T'-(O-A'-CO)$_{n'}$ to Z' is at least 5:1.

In one embodiment, the invention further provides a composition comprising:
(a) a hydrocarbon fluid;
(b) optionally, an oil of lubricating viscosity; and
(c) a dispersant of formulae (I) or (II), including salts thereof

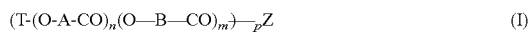

(I)

or

(II)

wherein
T or T' is hydrogen or a polymerising terminating group;
A is $C_{16-20}$ alkenylene group;
B is $C_{10-20}$ alkylene group;
Z and Z' are the residue of a polyamine or polyimine;
n is 2 to 50;
m is 0 to 25;
p and p' are 2 or more, in one embodiment not greater than 2000 and in another embodiment not greater than 1000;
A' is $C_{8-20}$ alkylene or alkenylene group;
n' is 2 to 10; and the weight ratio of T-(O-A-CO)$_n$ (O—B—CO)$_m$ to Z or T'-(O-A'-CO)$_{n'}$ to Z' is at least 5:1.

In one embodiment, the composition is free of dispersed pigments or colorants.

Hydrocarbon Fluid

The hydrocarbon fluid is an oil and includes aliphatic or liquid aromatic. The hydrocarbon may be a crude, black oil or a non-volatile fraction from a distillation of a crude oil. The hydrocarbon may also be a heavy fuel such as a heavy distillate heating oil or marine/industrial fuel oil, including bunker fuel. The hydrocarbon may also be any petrochemical process oil which has a propensity to form asphaltenic and ultimately coke-like species at surfaces under high temperature conditions. In one embodiment, the hydrocarbon fluid is an oil field product, e.g., a whole well product or a multiphase mixture in or from a well bore or one at a well head after at least partial separation of gas and/or water, for instance, an oil export fraction. In one embodiment, the hydrocarbon fluid is a refinery or petrochemical process stream or a heavy distillate or residual fuel.

The hydrocarbon may contain at least 0.01 wt % of asphaltene, in another embodiment up to a maximum of 30 wt % of asphaltene. Examples of suitable ranges of asphaltene present in the hydrocarbon fluid include up to 90 wt % or 0.001 wt % to 90 wt %, 0.01 wt. % to 70 wt % or 0.04 to 50 wt % or 0.06 to 30 wt %. In one embodiment, the asphaltene content is up to 90 wt %. Generally, higher asphaltene content is present in an oil shale, bitumen or asphalt.

The hydrocarbon fluid may further comprise wax often present from 0 wt % to 35 wt %, 0.5 wt % to 30 wt % or 1 wt % to 15 wt %; gas present from 0 wt % to 10 wt % or water (or water droplets) from 0 wt % to 20 wt %. The hydrocarbon fluid in one embodiment has multiple phases between the oil and gas and/or water.

Oil of Lubricating Viscosity

The method of the invention optionally includes an oil of lubricating viscosity; and the composition includes a lubricating viscosity including natural or synthetic oils of lubricating viscosity, oil derived from hydrocracking, hydrogenation, hydrofinishing, unrefined, refined and re-refined oils, or mixtures thereof. In one embodiment the oil of lubricating viscosity is a carrier fluid for the dispersant and/or other performance additives.

Natural oils include animal oils, vegetable oils, mineral oils or mixtures thereof. Synthetic oils include a hydrocarbon oil, a silicon-based oil, a liquid ester of phosphorus-containing acid. Synthetic oils may be produced by Fischer-Tropsch reactions and typically may be hydroisomerised Fischer-Tropsch hydrocarbons or waxes.

Oils of lubricating viscosity may also be defined as specified in the American Petroleum Institute (API) Base Oil Interchangeability Guidelines. In one embodiment, the oil of lubricating viscosity comprises an API Group I, II, III, IV, V or mixtures thereof, and in another embodiment API Group I, II, III or mixtures thereof. If the oil of lubricating viscosity is an API Group II, III, IV or V oil there may be up to about 40 wt % and in another embodiment up to a maximum of about 5 wt % of the lubricating oil an API Group I oil.

Dispersant

The dispersant represented by the polymer chain T-(O-A-CO)$_n$(O—B—CO)$_m$ in one embodiment is a block and in another embodiment random such that units of (O-A-C)) and (O—B—CO) can be randomly inserted with respect to the other rather than inserted as blocks. It should be noted that either the moiety represented by —(O-A-CO)— or —(O—B—CO)— may be attached to T.

In one embodiment, the ratio of n to m is not less than 2:1, in another embodiment not less than 4:1, and in another embodiment not less than 10:1. In one embodiment m is 0. The value of n+m in one embodiment is not less than 2, in another embodiment not greater than 10, and in another embodiment not greater than 6.

n' in one embodiment is not less than 3, in another embodiment not less than 4, in another embodiment not greater than 8, and in another embodiment not greater than 6.

When T or T' is a polymerisation terminating group in one embodiment, it is the residue of a carboxylic acid of formula T-COOH or T'-COOH, wherein T or T' includes an aromatic, a heterocyclic, an alicyclic or aliphatic moiety which is optionally substituted by halogen, $C_{1-4}$ alkoxy, hydroxy and/or ether groups. When T or T' is aliphatic, it may be linear or branched, saturated or unsaturated. In one embodiment, T or T' is unsubstituted, linear and saturated alkyl. In several embodiments, examples of suitable T or T' groups include hydrogen, hydroxyl, linear or branched alkyl, aryl, alkoxy, amino, mono- or di-alkylamino (all known polymerisation terminating groups).

The total number of carbon atoms in T or T' may be as high as 50, in another embodiment not greater than 30, in another embodiment not greater than 25, and in another embodiment not greater than 20. In one embodiment, T or T' contains not less than 8, in another embodiment not less than 12, and in another embodiment not less than 14 carbon atoms.

A is $C_{16-20}$ alkenylene group, optionally linear or branched and optionally further substituted by halogen, $C_{1-4}$ alkoxy, hydroxy and/or ether groups. In one embodiment, (O-A-CO) or (O-A'-CO) is the residue of ricinoleic acid or 12-hydroxystearic acid.

A' is $C_{8-20}$ alkenylene or alkylene group, optionally linear or branched and optionally further substituted by halogen, $C_{1-4}$ alkoxy, hydroxy and/or ether groups. In one embodiment, the number of carbon atoms present in A' is at least 10, in another embodiment at least 12 and in another embodiment at least 14. In one embodiment, (O-A'-CO) is the residue of ricinoleic acid.

B is $C_{10-20}$ alkylene group, optionally linear or branched and optionally further substituted by halogen, $C_{1-4}$ alkoxy, hydroxy and/or ether groups.

In one embodiment, B is a $C_{10-16}$ alkylene group. Examples of a hydroxycarboxylic acid from which (O—B—CO) is derivable include 12-hydroxydodecanoic acid, 5-hydroxydodecanoic acid, 5-hydroxydecanoic acid, 4-hydroxydecanoic acid or 12-hydroxystearic acid.

Although A and B are as defined above in one embodiment, the definitions are reversed in formula (I) i.e. A is defined as B and B is defined as A. In some embodiments, it is desirable that all of the A and all of the B units not be the same identical molecular structure but rather it is desirable in those embodiments that at least one unit of the A or repeat units be a molecule with a different number of carbon atoms and/or different branching or substituents. Variation in the repeat units of such polyesters enhances solubility in most continuous phases.

The weight ratio of T-(O-A-CO)$_n$(O—B—CO)$_m$ to Z or T'-(O-A'-CO)$_{n'}$ to Z' in one embodiment is at least 5:1, in another embodiment 6:1 or higher, in another embodiment 7:1 to 30:1, in another embodiment 7:1 to 25:1 and in another embodiment from 8:1 to 20:1, for example, 10:1, 12:1, 13:1, 14:1, 15:1 or 18:1.

Z or Z' is an amine in one embodiment, the residue of polyallylamine, polyvinylamine or polyalkyleneimine such as poly($C_{2-4}$-alkyleneimine) (hereinafter PAI) or poly(ethyleneimine) (hereinafter PEI). In one embodiment, the polyalkyleneimine includes a linear or a branched moiety.

Linear polyethyleneimines include those prepared by hydrolysis of poly (N-acyl) alkyleneimines as described by Takeo Saegusa et al in Macromolecules, 1972, Vol. 5, page 4470. Branched polyethyleneimines of differing molecular weight are available from BASF and Nihon Shokubai. Polyallylamine and poly (N-alkyl) allylamines of differing molecular weight are available from Nitto Boseki. Polyvinylamines are available from Mitsubishi Kasei. Poly (propyleneimine) dendrimers are available from DSM Fine Chemicals and poly (amidoamine) dendrimers are available as "Starburst" dendrimers from Aldrich Chemical Company.

The polyamine or polyimine in one embodiment has a weight-average molecular weight from 300 to 600,000, in another embodiment 500 to 600,000, in another embodiment 1,000 to 200,000, in another embodiment 1,000 to 100,000 and in another embodiment 1,000 to 70,000.

In one embodiment, the dispersant includes those obtained/obtainable by reacting the polyamine or polyimine with two or more polyoxyalkenylenecarbonyl (hereinafter POAC) chains containing a free carboxylic acid of formula (III):

$$T\text{-}(O\text{-}A\text{-}CO)_n(O\text{—}B\text{—}CO)_m\text{—}OH \qquad (III)$$

wherein T, A, B, n and m are as defined hereinbefore. The acid of formula (III) is hereinafter referred to as a TPOAC acid.

The dispersants obtained/obtainable from TPOAC may be prepared by reacting the polyamine or polyimine with a TPOAC acid at a temperature in one embodiment between 50° C. and 250° C., in another embodiment the temperature is not less than 80° C. and in another embodiment to minimise charring of the dispersant, the temperature is not greater than 150° C. The dispersant is typically prepared in an inert atmosphere.

The inert atmosphere may be provided by any gas which does not react with the dispersant or with the starting materials and includes the inert gases of the Periodic Table or nitrogen.

The TPOAC acid may be prepared using similar conditions to those employed when reacting the TPOAC acid with the polyamine or polyimine. However, it is useful to further include an esterification catalyst such as a tetra-alkyl titanate, for example, tetrabutyltitanate, a zinc salt of an organic acid, for example, zinc acetate, a zirconium salt of an aliphatic alcohol, for example, zirconium isopropoxide, toluene sulphonic acid or a strong organic acid such as a halo acetic acid, for example, trifluoro acetic acid. The polymerisation is typically carried out at temperatures between 150° C. and 180° C.

In another embodiment, the dispersant may also be prepared by reacting the polyamine or polyimine with a hydroxy carboxylic acid and subsequently reacting the free hydroxy group with more hydroxy carboxylic acid in order to build the POAC chain. Some commercial sources of hydroxy carboxylic acids contain carboxylic acids which are free from hydroxy groups as an impurity. Consequently, when such sources of hydroxy carboxylic acids are used to prepare the dispersants, it is not necessary to add a separate polymerisation terminating compound since the carboxylic acid which is free from hydroxy groups can fulfill this function.

When the dispersant is prepared by reacting the polyamine or polyimine with a hydroxy carboxylic acid, the reaction conditions employed are typically the same as those used for reacting a TPOAC acid with a polyamine or polyimine. Subsequent building of the POAC chain is carried out under conditions similar to those used for preparing the TPOAC acid.

In one embodiment, useful effects have been obtained with dispersants of formula 1 wherein the TPOAC acid is ricinoleic acid, optionally containing 12-hydroxystearic acid and optionally containing stearic acid as polymerisation terminating group with a number-average molecular weight between 800 and 2,000 and Z is the residue of PEI having a number-average molecular weight of from 600 to 120,000 or 1,000 to 70,000.

In one embodiment, the polyamine is an alkylene polyamine. Examples of the alkylene polyamine include ethylenepolyamines, butylenepolyamines, propylenepolyamines, pentylenepolyamines, etc. The higher homologs and related heterocyclic amines such as piperazines and N-aminoalkyl-substituted piperazines are also included. Specific examples of such polyamines are ethylenediamine, diethylenetriamine (DETA), triethylenetetramine (TETA), tris-(2-amino-ethyl)amine, propylenediamine, trimethylenediamine, tripropylenetetramine, tetraethylenepentamine, hexaethyleneheptamine or pentaethylenehexamine.

Higher homologs obtained by condensing two or more of the above-noted alkylene amines are similarly useful as are mixtures of two or more of the aforedescribed polyamines.

Ethylenepolyamines, such as those mentioned above, are useful. Such polyamines are described in detail under the heading Ethylene Amines in Kirk Othmer's "Encyclopedia of Chemical Technology", 2d Edition, Vol. 7, pages 22-37, Interscience Publishers, New York (1965). Such polyamines are most conveniently prepared by the reaction of ethylene dichloride with ammonia or by reaction of an ethylene imine with a ring opening reagent such as water, ammonia, etc. These reactions result in the production of a complex mixture of polyalkylenepolyamines including cyclic condensation products such as the aforedescribed piperazines.

Other useful types of polyamine mixtures are those resulting from stripping of the above-described polyamine mixtures to leave as residue what is often termed "polyamine bottoms". In general, alkylenepolyamine bottoms can be characterised as having less than two, usually less than 1% (by weight) material boiling below about 200° C. A typical sample of such ethylene polyamine bottoms obtained from the Dow Chemical Company of Freeport, Tex. designated "E-100" has a specific gravity at 15.6° C. of 1.0168, a percent nitrogen by weight of 33.15 and a viscosity at 40° C. of 121 centistokes. Gas chromatography analysis of such a sample contains about 0.93% "Light Ends" (most probably DETA), 0.72% TETA, 21.74% tetraethylene pentamine and 76.61% pentaethylenehexamine and higher (by weight). These alkylenepolyamine bottoms include cyclic condensation products such as piperazine and higher analogs of diethylenetriamine or triethylenetetramine.

When employing a polyamine such as polyamine bottoms to obtain optimum performance, it may be necessary to increase the weight ratio of T-(O-A-CO)$_n$(O—B—CO)$_m$ to Z or T'-(O-A'-CO)$_{n'}$ to Z' to 10:1, 12:1 or higher.

The dispersant of the invention employing a polyamine bottoms (HPA-X®) may be prepared by adding polyricinoleic acid (200 g) to 500 ml flange flask with a thermocouple and a nitrogen inlet. The flask further contains a paddle stirrer with stirrer motor and guide. The contents are stirred in nitrogen atmosphere. The contents are warmed to 90° C. Heavy polyamine (HPA-X® Dow Chemicals) (11.1 g) is charged to a 100 ml pressure equalising dropping funnel and the amine added drop wise over 30 minutes. The temperature increases from 90° C. to 91.1° C. during the addition. The vessel is lagged with glass wool and the temperature increased to 120° C. and held for 5 hours. The dispersant has a weight ratio of polyester to polyamine bottoms of 18:1.

Optionally, the composition further includes a dispersant other than that disclosed in formulae (I) and/or (II) above. The dispersant includes an ionic (cationic or anionic) or non-ionic compound.

Examples of a suitable optional dispersant include an alkylene vinyl acetate (e.g., ethylene vinyl acetate), monoester copolymer of styrene maleic anhydride, a poly(meth)acrylate, a phosphate ester, alkyl sulpho-succinic ester, a hydrocarbyl-substituted carboxylic acid acylating agent, a mono-substituted alkylphenol-polyethylene polyamine-formaldehyde resin (as disclosed in U.S. Pat. No. 5,494,607), an ether carboxylic acid or derivatives thereof; and mixtures thereof.

Examples of other dispersant compounds suitable for the invention are disclosed in *McCutcheon's Emulsifiers and Detergents,* 1993, North American & International Edition. Generic examples include alkanolamides, alkylarylsulphonates, amine oxides, poly(oxyalkylene) compounds, including block copolymers comprising alkylene oxide repeat units (e.g., Pluronic™), carboxylated alcohol ethoxylates, ethoxylated alcohols, ethoxylated alkyl phenols, ethoxylated amines and amides, ethoxylated fatty acids, ethoxylated fatty esters and oils, fatty esters, glycerol esters, glycol esters, imidazoline derivatives, lecithin and derivatives, lignin and derivatives, monoglycerides and derivatives, olefin sulphonates, phosphate esters and derivatives, propoxylated and ethoxylated fatty acids or alcohols or alkyl phenols, sorbitan derivatives, sucrose esters and derivatives, sulphates or alcohols or ethoxylated alcohols or fatty esters, polyisobutylene succinicimide and derivatives, sulphonates of dodecyl and tridecyl benzenes or condensed naphthalenes or petroleum, sulphosuccinates and derivatives, and a hydrocarbyl substituted benzene sulphonic acid.

In one embodiment, the optional dispersant is a hydrocarbyl-substituted carboxylic acid acylating agent including a derivative of a polyolefin. Typical examples of a polyolefin include polyisobutene; polypropylene; polyethylene; a copolymer derived from isobutene and butadiene; a copolymer derived from isobutene and isoprene; or mixtures thereof.

In one embodiment, the polyolefin is a derivative of polyisobutene with a number average molecular weight of at least about 250, 300, 500, 600, 700, or 800, to 5000 or more, often up to about 3000, 2500, 1600, 1300, or 1200. Typically, less than about 5% by weight of the polyisobutylene used to make the derivative molecules have $\overline{Mn}$ less than about 250, more often the polyisobutylene used to make the derivative has $\overline{Mn}$ of at least about 800. The polyisobutylene used to make the derivative preferably contains at least about 30% terminal vinylidene groups, more often at least about 60% and more preferably at least about 75% or about 85% terminal vinylidene groups. The polyisobutylene used to make the derivative may have a polydispersity, $\overline{Mw}/\overline{Mn}$, less than about 25, less than 15, less than 5 to less than 3. Examples of suitable ranges include from 1.1 to 3, or 3.1 to 5.9, or 6 to 20.

In one embodiment, the polyisobutene is substituted with succinic anhydride, the polyisobutene substituent having a number average molecular weight of about 1,500 to about 3,000, in another embodiment about 1,800 to about 2,300, in another embodiment about 700 to about 1300, in another embodiment about 800 to about 1000, said first polyisobutene-substituted succinic anhydride being characterised by about 1.3 to about 2.5, and another embodiment about 1.7 to about 2.1. In one embodiment, the hydrocarbyl-substituted carboxylic acid acylating agent is a polyisobutene-substituted succinic anhydride, the polyisobutene substituent having a number average molecular weight of about 1,500 to about 3,000, and in another embodiment about 1,800 to about 2,300, said first polyisobutene-substituted succinic anhydride being characterised by about 1.3 to about 2.5, and in another embodiment about 1.7 to about 2.1, in another embodiment about 1.0 to about 1.3, and in yet another embodiment about 1.0 to about 1.2 succinic groups per equivalent weight of the polyisobutene substituent.

In one embodiment, the surfactant has a molecular weight of less than about 1000, in another embodiment less than about 950, for example, about 250, about 300, about 500, about 600, about 700, or about 800.

In one embodiment, the surfactant is polyisobutenyl-dihydro-2,5-furandione ester with pentaerythritol or mixtures thereof. In one embodiment, the surfactant is a polyisobutylene succan derivative such as a polyisobutylene succinimide or derivatives thereof. In one embodiment the surfactant is substantially free to free of a basic nitrogen.

Other typical derivatives of polyisobutylene succans include hydrolysed succans, esters or diacids. Polyisobutylene succan derivatives are preferred to make the metal base dispersions. A large group of polyisobutylene succan derivatives are taught in U.S. Pat. Nos. 4,708,753 or 4,234,435.

Other Performance Additive

Optionally, the composition further includes at least one other performance additive. The other performance additive compounds include a metal deactivator, a detergent, an anti-wear agent, an antioxidant, a corrosion inhibitor, a foam inhibitor, a demulsifiers, a pour point depressant, a seal swelling agent, one or more wax control polymers (including wax crystal modifiers and wax dispersants, such as ethylene vinyl acetate, fumarate vinyl acetate, copolymer esters or alkyl phenol resins), scale inhibitors including phosphate esters, gas-hydrate inhibitors (often known as freeze point depressant) including methanol or mixtures thereof.

The total combined amount of the other performance additive compounds present on an oil free basis in ranges from about 0 wt % to about 25 wt %, in another embodiment about 0.0005 wt % to about 25 wt %, in another embodiment about 0.001 wt % to about 20 wt % and in yet another embodiment about 0.002 wt % to about 15 wt % of the composition. Although one or more of the other performance additives may be present, it is common for the other performance additives to be present in different amounts relative to each other.

Process

The invention further provides a process for preparing a composition comprising the steps of mixing an oil of lubricating viscosity; and a dispersant of formulae (I) and/or (II) to form a dilute composition or a concentrate.

Components (a)-(b) may be mixed sequentially and/or separately to form the dilute composition or concentrate. The mixing conditions include for a period of time in the range about 30 seconds to about 48 hours, in another embodiment about 2 minutes to about 24 hours, in another embodiment about 5 minutes to about 16 hours and in yet another embodiment about 10 minutes to about 5 hours; and at pressures in the range including about 86 kPa to about 500 kPa (about 650 mm Hg to about 3750 mm Hg), in another embodiment about 86 kPa to about 266 kPa (about 650 mm Hg to about 2000 mm Hg), in another embodiment about 91 kPa to about 200 kPa (about 690 mm Hg to about 1500 mm Hg), and in yet another embodiment about 95 kPa to about 133 kPa (about 715 mm Hg to about 1000 mm Hg); and at a temperature including about 15° C. to about 70° C., and in another embodiment about 25° C. to about 70° C.

The process optionally includes mixing the other optional performance additives as described above. The optional performance additives may be added sequentially, separately or as a concentrate.

INDUSTRIAL APPLICATION

The method and composition of the invention are useful the reduction and/or inhibition of asphaltene deposit formation and/or flocculation in an subterranean oil reservoir, oil pipe line or storage vessel or other relevant equipment a hydrocarbon fluid, e.g., a crude oil may come in contact with. The method and composition of the invention are also useful in the reduction and/or inhibition of deposit formation and settling in industrial and marine hydrocarbon fuel systems, including where fuel stream mixing may occur and give rise to asphaltenic destabilization, agglomeration and settling or deposition. The method and composition of the invention are also useful in the inhibition of deposition of asphaltenic species at surfaces in refinery and petrochemical processes.

The composition comprising a dispersant of formulae (I) and/or (II) may be present in an oil reservoir, pipe line, or storage vessel or other relevant equipment in an amount including 1 ppm to 30 wt % of the dispersant, in another embodiment 5 ppm to 10 wt % of the dispersant, in another embodiment 20 ppm to 3 wt % of the dispersant and in another embodiment 40 ppm to 1 wt % of the dispersant. For example the dispersant is present from 60 ppm to 500 ppm or 80 ppm to 350 ppm.

The following examples provide an illustration of the invention. These examples are non exhaustive and are not intended to limit the scope of the invention.

EXAMPLES

Preparative Example 1

Dispersant of Poly(ricinoleic acid) with PEI Ratio 13:1

Ricinoleic acid (10 g) was heated to 180° C. (oil bath temperature 200° C.) and 0.2 g of zirconium-n-butylate was added. Heating and rapid stirring under an $N_2$ atmosphere was continued for 7 hours after which the resultant poly (ricinoleic acid) exhibited an Acid Value of 49.8 mg KOH/g. The reaction mixture was then cooled to 90° C. (oil bath temperature) and PEI added (the PEI was warmed to 90° C. before addition to the reaction). The reaction was stirred at 90° C. for 5 minutes then heated to 120° C. After reaching 120° C. (oil bath temperature) the reaction was stirred at 120° C. (oil bath temperature) for a further 17 hours (NB: The $N_2$ flow was increased to help remove water formed). The product was formed as a golden thick syrup. The dispersant has a weight ratio of polyester to PEI of 13:1. This is dispersant 1.

Preparative Example 2 to 10

Polyester to PEI Varied Weight Ratio's

The process is similar to Example 1, except using the amounts of poly (ricinoleic acid) (PRA) and polyethylene amine (PEI) shown in Table 1.

TABLE 1

| Preparative EX | Dispersant | Polyester | PEI | Weight Ratio polyester to PEI |
|---|---|---|---|---|
| 2 | 2 | PRA, 2100 | SP200 | 20:1 |
| 3 | 3 | PRA, 1040 | SP200 | 20:1 |
| 4 | 4 | PRA, 1770 | SP200 | 12:1 |
| 5 | 5 | PRA, 1500 | SP200 | 8:1 |
| 6 | 6 | PRA, 1770 | SP050 | 8:1 |
| 7 | 7 | PRA, 2400 | SP200 | 20:1 |
| 8 | 8 | RA/HSA, 1727 | SP200 | 14:1 |
| 9 | 9 | RA/HSA, 1727 | SP200 | 15:1 |
| 10 | 10 | PRA, 1100 | SP200 | 18:1 |

Footnote to Table 1:
PRA is poly (ricinoleic acid) and the number following is the number average molecular weight.
RA is ricinoleic acid.
HSA is 12-hydroxystearic acid.
Preparative Examples 8 and 9 used a 1:1 molar ratio of ricinoleic acid and 12-hydroxystearic acid.
SP 200 is PEI ex Nippon Shokubai with average molecular weight of 10,000.
SP 018 is PEI ex Nippon Shokubai with average molecular weight of 1,800.
SP 050 PEI ex Nippon Shokubai with average molecular weight of 5,000.

Preparative Example 11

Poly(12-hydroxystearic Acid) and PEI

Poly(12-hydroxystearic acid (PHS) (MW 1600, 55 parts, Polyester A, Agent A U.S. Pat. No. 4,224,212) is heated to 120° C. with stirring under a nitrogen atmosphere. PEI (MW 10,000, 11 parts, SP200) is added and the reactants stirred under nitrogen at 120° C. for a further 6 hours. On cooling, the product obtained has a PHS to PEI weight ratio of 5:1.

Preparative Examples 12 to 19
Poly(12-hydroxystearic Acid) and PEI with Varied Weight Ratio The process is the same as Preparative Example 11, except using the amounts of PHS and PEI shown in Table 2.

TABLE 2

| Preparative EX | Dispersant | Amount of PHS (parts) | Amount of PEI (parts) | Weight Ratio PHS to PEI |
|---|---|---|---|---|
| 12 | 12 | 49 | 7 | 7:1 |
| 13 | 13 | 40 | 5 | 8:1 |
| 14 | 14 | 54 | 6 | 9:1 |
| 15 | 15 | 50 | 5 | 10:1 |
| 16 | 16 | 48 | 4 | 12:1 |
| 17 | 17 | 45 | 3 | 15:1 |
| 18 | 18 | 51 | 3 | 17:1 |
| 19 | 19 | 50 | 2.5 | 20:1 |

All of the examples disclosed herein employ a commercially available asphaltene containing crude oil.

Example 1 to 3

Dispersant Composition

Examples 1 to 3 contain 100 ppm, 200 ppm, and 300 ppm respectively of the product of Preparative Example 10 in an asphaltene containing crude oil "type 1".

Example 4

Dispersant Composition

Example 4 contains 100 ppm of the product of Preparative Example 10 in an asphaltene containing crude oil "type 2".

Example 5

Dispersant Composition

Example 5, is the same as Example 4 except using the product of Preparative Example 15 instead of Preparative Example 10.

Example 6

Dispersant Composition

Example 6 is the same as Example 4, except the asphaltene containing crude oil is a "type 3".

Example 7

Dispersant Composition

Example 7 is the same as Example 5, except the asphaltene containing crude oil is a "type 3".

Reference Examples 1 to 3

Commercially Available Dispersant Compositions

Reference Examples 1 to 3, contain 100 ppm, 200 ppm, and 300 ppm respectively of a commercially available asphaltene dispersant in a crude oil of "type 1".

Reference Example 4

Commercially Available Dispersant Compositions

Reference Example 4 contains 100 ppm of commercially available asphaltene dispersant in a crude oil of "type 2".

Reference Example 5

Commercially Available Dispersant Compositions

Reference Example 5 is the same as Reference Example 4, except the asphaltene containing a crude oil of "type 3".

Test 1: Optical Settling Rate Measurement Test

The light turbidity test is used to determine the rate of flocculation and/or settling of an asphaltene dispersion, i.e., the point where the asphaltene is no longer stabilised in oil, and its rate of settling following the introduction of the test oil into a short chain (generally C5-C7) alkene flocculant. The test employs filling a measurement cell of a Turbiscan® MA 2000 liquid dispersion optical characterisation apparatus and scanning the sample 70 mm in a vertical plane in order to periodically measure the progression of the asphaltene settling front which can be expressed as a percentage change in the average transmission through the sample over the 70 mm scanned depth with a light source with a wavelength of 850 nm. The stability of the asphaltenic dispersion in the oil is determined by measuring the average percentage change in light transmitted on the addition of the short chain alkene at regular intervals over a 15 minute test period.

Generally, samples with lower percent changes in light transmission have more stable asphaltene dispersions. The results obtained are shown in Tables 3-4. For Examples 1-3 and Reference Examples 1-3, the oil only has a percentage change in light transmission of 32. The oil used in Examples 4-5 and References Example 4 has a percentage change in light transmission of 31. The oil used in Examples 6-7 and References Example 5 has a percentage change in light transmission of 32).

TABLE 3

| Treat Rate (ppm) | Dispersion Composition | % Change in Light Transmission | Reference Example | % Change in Light Transmission |
|---|---|---|---|---|
| 100 | 1 | 7 | 1 | 20 |
| 200 | 2 | 6 | 2 | 11 |
| 300 | 3 | 0 | 3 | 4 |

TABLE 4

| Dispersion Composition | % Change in Light Transmission |
|---|---|
| Example 4 | 5 |
| Example 5 | 6.5 |
| Reference Example 4 | 10 |
| Example 6 | 0 |
| Example 7 | 0 |
| Reference Example 5 | 5.5 |

Overall, the analysis indicates that the method and composition of the invention provide a reduction and/or inhibition of asphaltene flocculation and/or deposit formation in an subterranean oil reservoir, oil pipe line or storage vessel, or other relevant equipment a hydrocarbon fluid may come in contact with.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements. As used herein, the expression "consisting essentially of" permits the inclusion of substances that do not materially affect the basic and novel characteristics of the composition under consideration.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include:

hydrocarbon substituents, that is, aliphatic (e.g., alkyl or alkenyl), alicyclic (e.g., cycloalkyl, cycloalkenyl) substituents, and aromatic-, aliphatic-, and alicyclic-substituted aromatic substituents, as well as cyclic substituents wherein the ring is completed through another portion of the molecule (e.g., two substituents together form a ring);

substituted hydrocarbon substituents, that is, substituents containing non-hydrocarbon groups which, in the context of this invention, do not alter the predominantly hydrocarbon nature of the substituent (e.g., halo (especially chloro and fluoro), hydroxy, alkoxy, mercapto, alkylmercapto, nitro, nitroso, and sulfoxy);

hetero substituents, that is, substituents which, while having a predominantly hydrocarbon character, in the context of this invention, contain other than carbon in a ring or chain otherwise composed of carbon atoms. Heteroatoms include sulfur, oxygen, nitrogen, and encompass substituents as pyridyl, furyl, thienyl and imidazolyl. In general, no more than two, in one embodiment no more than one, non-hydrocarbon substituent will be present for every ten carbon atoms in the hydrocarbyl group; typically, there will be no non-hydrocarbon substituents in the hydrocarbyl group.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A method of asphaltene control in a hydrocarbon fluid, the method employing a composition comprising: a hydrocarbon fluid, optionally an oil of lubricating viscosity and a dispersant of formulae (I) or (II), including salts thereof

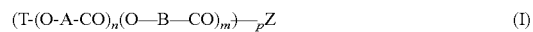  (I)

or

  (II)

wherein

T or T' is hydrogen or a polymerising terminating group;

A is $C_{16-20}$ alkylene or alkenylene group;

B is $C_{10-20}$ alkylene or alkenylene group;

Z and Z' are the residue of a polyamine or polyimine, wherein the polyamine or polyimine has a weight-average molecular weight from 1,000 to 200,000;

n is 2 to 50;

m is 0 to 25;

p and p' are 2 or more;

A' is $C_{8-20}$ alkylene or alkenylene group;

n' is 2 to 10; and the weight ratio of T-(O-A-CO)$_n$ (O—B—CO)$_m$ to Z or T'-(O-A'-CO)$_{n'}$ to Z' is at least 5:1, wherein the hydrocarbon fluid is an oil field product, a refinery or petrochemical process stream, a heavy distillate or residual fuel, and wherein the hydrocarbon fluid has an asphaltene content of at least 0.01 wt %.

2. The method of claim 1, wherein the hydrocarbon fluid has an asphaltene content of up to a maximum of 90 wt %.

3. The method of claim 1, wherein the dispersant is represented by the polymer chain T-(O-A-CO)$_n$(O—B—CO)$_m$ is a block copolymer or a random opolymer.

4. The method of claim 1, wherein the dispersant has a weight ratio of T-(O-A-CO)$_n$ (O—B—CO)$_m$ to Z or T'-(O-A'-CO)$_{n'}$ to Z' of 6:1 or higher.

5. The method of claim 4, wherein the dispersant has a weight ratio of T-(O-A-CO)$_m$(O—B—CO)$_n$ to Z or T'-(O-A'-CO)$_m$ to Z' of 7:1 to 30:1.

6. The method of claim 1, wherein the polyamine or polyimine (Z or Z') of the dispersant is the residue of polyallylamine, polyvinylamine or polyalkyleneimine.

7. The method of claim 1, wherein (O-A-CO) or (O-A'-CO) is the residue of ricinoleic acid.

8. The method of claim 1, wherein the composition is free of dispersed pigments or colorants.

9. The method of claim 1, wherein the hydrocarbon fluid has an asphaltene content of 0.04 to 50 wt %.

10. The method of claim 1, wherein the hydrocarbon fluid has an asphaltene content of 0.06 to 30 wt %.

11. The method of claim 1, wherein p and p' are not greater than 2000.

12. The method of claim 1, wherein p and p' are not greater than 1000.

13. The method of claim 1, wherein the weight ratio of $T\text{-}(O\text{-}A\text{-}CO)_n(O\text{—}B\text{—}CO)_m$ to $Z$ or $T'\text{-}(O\text{-}A'\text{-}CO)_{n'}$ to $Z'$ is 12:1 to 20:1.

* * * * *